United States Patent
Yeh

(10) Patent No.: US 12,056,357 B2
(45) Date of Patent: Aug. 6, 2024

(54) HIGH AVAILABILITY SYSTEM AND INPUT/OUTPUT MODULE (IOM) ASSEMBLY

(71) Applicant: MITAC COMPUTING TECHNOLOGY CORPORATION, Taoyuan (TW)

(72) Inventor: Yu-Shu Yeh, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 31 days.

(21) Appl. No.: 18/166,998

(22) Filed: Feb. 9, 2023

(65) Prior Publication Data
US 2023/0259281 A1    Aug. 17, 2023

(30) Foreign Application Priority Data
Feb. 14, 2022  (TW) .................. 111105321

(51) Int. Cl.
G06F 3/06 (2006.01)
(52) U.S. Cl.
CPC ............ G06F 3/061 (2013.01); G06F 3/0655 (2013.01); G06F 3/0679 (2013.01)
(58) Field of Classification Search
CPC ....... G06F 3/061; G06F 3/0655; G06F 3/0679
See application file for complete search history.

(56) References Cited

U.S. PATENT DOCUMENTS

| | | | | |
|---|---|---|---|---|
| 2008/0313658 | A1* | 12/2008 | Cagno | G06F 13/4022 719/326 |
| 2013/0339587 | A1* | 12/2013 | Asnaashari | G06F 11/20 711/103 |
| 2018/0246833 | A1* | 8/2018 | Bai | G06F 3/0617 |
| 2021/0311889 | A1* | 10/2021 | Tsai | G06F 3/0679 |
| 2022/0075557 | A1* | 3/2022 | Slik | G06F 3/0659 |
| 2022/0232074 | A1* | 7/2022 | Scaglione | H04L 69/18 |
| 2022/0319556 | A1* | 10/2022 | Dong | G06F 1/3268 |

FOREIGN PATENT DOCUMENTS

TW    202134881 A    9/2021

OTHER PUBLICATIONS

Search Report appended to an Office Action, which was issued to Taiwanese counterpart application No. 111105321 by the TIPO on Aug. 19, 2022, with an English translation thereof.

* cited by examiner

*Primary Examiner* — Edward J Dudek, Jr.
(74) *Attorney, Agent, or Firm* — Lewis Roca Rothgerber Christie LLP

(57) ABSTRACT

An HA system includes a first IOM having a first switch, a second IOM having a second switch, and a plurality of slot modules configured to be connected to a plurality of SSDs, respectively. Each of the slot modules has Port A' configured to be connected to the first IOM and Port B' configured to be connected to the second IOM. In response to detecting a connection of one of the SSDs to one of the slot modules, the first and second IOMs determine whether the SSD is a single-port type SSD. When it is determined that the SSD is a single-port type SSD, the first IOM controls the first switch to link up to said one of the slot modules and the second IOM controls the second switch to unlink said one of the slot modules.

12 Claims, 6 Drawing Sheets

HIGH AVAILABILITY SYSTEM AND INPUT/OUTPUT MODULE (IOM) ASSEMBLY

CROSS-REFERENCE TO RELATED APPLICATION

This application claims priority to Taiwanese Invention Patent Application No. 111105321, filed on Feb. 14, 2022.

FIELD

The disclosure relates to a high availability (HA) system, and more particularly to an HA system that enables stable access to solid state drives (SSDs).

BACKGROUND

Referring to FIG. 1, a conventional high availability (HA) system 9 includes solid state drives (SSDs) 92 and two Peripheral Component Interconnect Express (PCIe) switches 91a, 91b connected to the SSDs 92. Functions of the switches 91a, 91b include input/output control and configuration access, etc. The HA system 9 is configured to accommodate dual-port type SSDs (each having Port A and Port B), such as NVMe (non-volatile memory express) or SAS (serial-attached SCSI) dual-port SSDs, and provides two data access paths respectively for two hosts 90a, 90b to access the SSDs 92. Specifically, the host 90a accesses the SSDs 92 through the PCIe switch 91a via Port A (i.e., one of the data access paths), and the host 90b accesses the SSDs 92 through the PCIe switch 91b via Port B (i.e., another one of the data access paths). The HA system 9 may control either the PCIe switch 91a to link up to Port A, or the PCIe switch 91b to link up to Port B randomly.

It is noted that one or more single-port type SSDs (each having only Port A), such as SATA SSDs, may be installed in the HA system 9, replacing one or more of the dual-port type SSDs (i.e., one or more of the SSDs 92 are single-port type SSDs). In such a case, if the HA system 9 controls the PCIe switch 91b to link up to Port B (as opposed to controlling the PCIe switch 91a to link up to Port A), the hosts 90a, 90b will fail to access the single-port type SSDs since the single-port type SSDs do not have Ports B. Therefore, with single-port type SSD(s) installed in the HA system 9, stable access to the SSDs 92 cannot be ensured.

SUMMARY

Therefore, an object of the disclosure is to provide an HA system that can alleviate at least one of the drawbacks of the prior art.

According to the disclosure, the HA system includes a first input/output module (IOM) having a first switch, a second IOM having a second switch, a plurality of slot modules configured to be connected to a plurality of solid state drives (SSDs), respectively. The first and second switches are configured to perform I/O control and access configuration.

Each of the slot modules has Port A' configured to be connected to the first IOM and Port B' configured to be connected to the second IOM.

Each of the SSDs is either a dual-port type SSD or a single-port type SSD, and has an identification (ID) code that is used to determine whether the SSD is a dual-port type SSD or a single-port type SSD.

The first IOM, in response to detecting a connection of any one of the SSDs to one of the slot modules, determines whether the SSD is a single-port type SSD, and controls the first switch to link up to said one of the slot modules so as to enable the first IOM to read data from and write data to the SSD via Port A' of said one of the slot modules when it is determined that the SSD is a single-port type SSD.

The second IOM, in response to detecting a connection of any one of the SSDs to one of the slot modules, determines whether the SSD is a single-port type SSD, and controls the second switch to unlink said one of the slot modules when it is determined that the SSD is a single-port type SSD.

Another object of the disclosure is to provide an IOM assembly of an HA system that can alleviate at least one of the drawbacks of the prior art.

According to the disclosure, the HA system includes a plurality of slot modules that each have Port A' and Port B', and a plurality of SSDs that are configured to be connected to the plurality of slot modules, respectively. Each of the SSDs is either a dual-port type SSD or a single-port type SSD, and has an ID code that is used to determine whether the SSD is a dual-port type SSD or a single-port type SSD. The IOM assembly includes a first IOM including a first switch, and a second IOM including a second switch. The first and second switches are configured to perform I/O control and access configuration.

The first IOM, in response to detecting a connection of any one of the SSDs to one of the slot modules, determines whether the SSD is a single-port type SSD, and controls the first switch to link up to said one of the slot modules so as to enable the first IOM to read data from and write data to the SSD via Port A' of said one of the slot modules when it is determined that the SSD is a single-port type SSD.

The second IOM, in response to detecting a connection of any one of the SSDs to one of the slot modules, determines whether the SSD is a single-port type SSD, and controls the second switch to unlink said one of the slot modules when it is determined that the SSD is a single-port type SSD.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
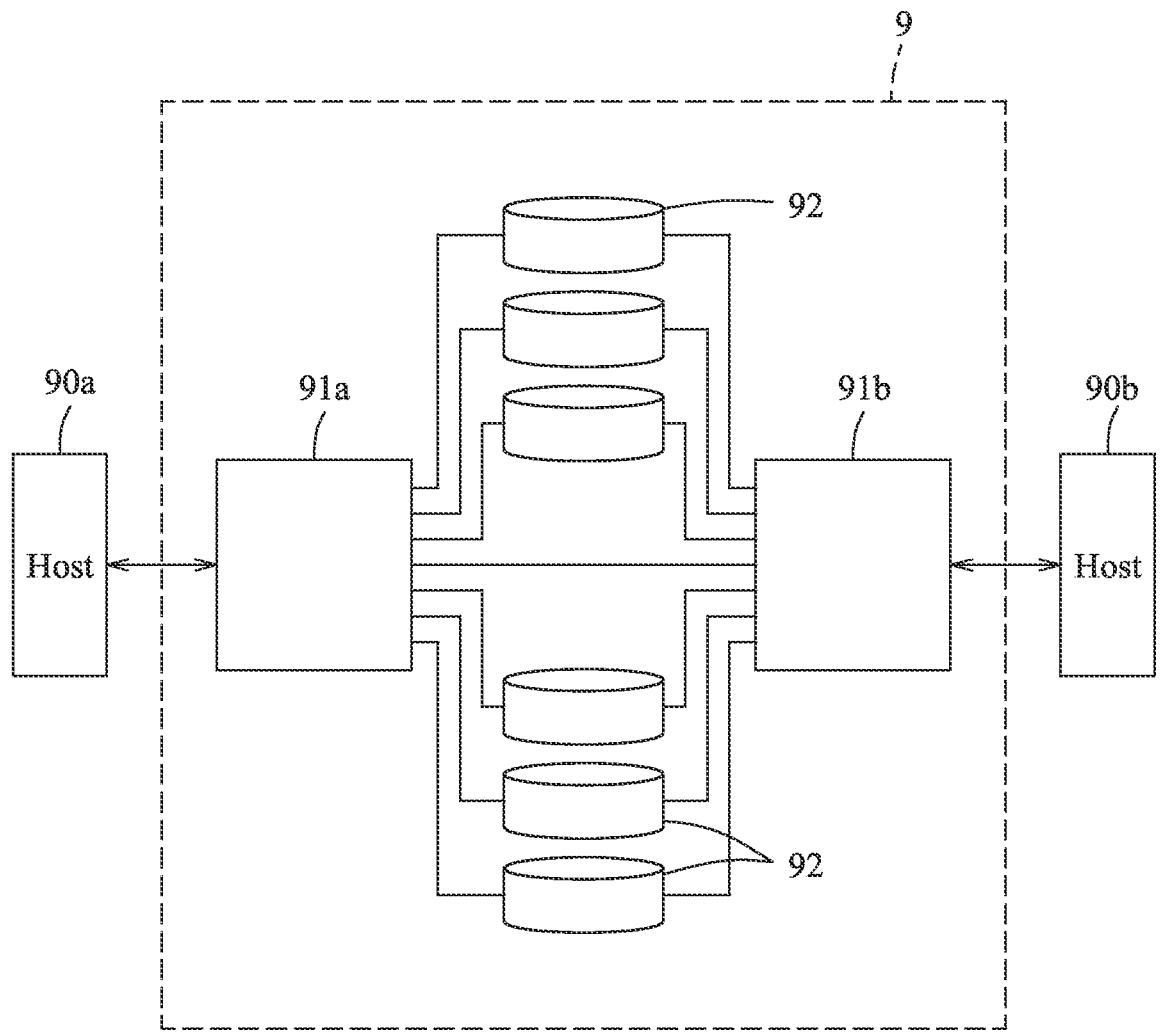
FIG. 1 is a block diagram of a conventional high availability (HA) system.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 2:
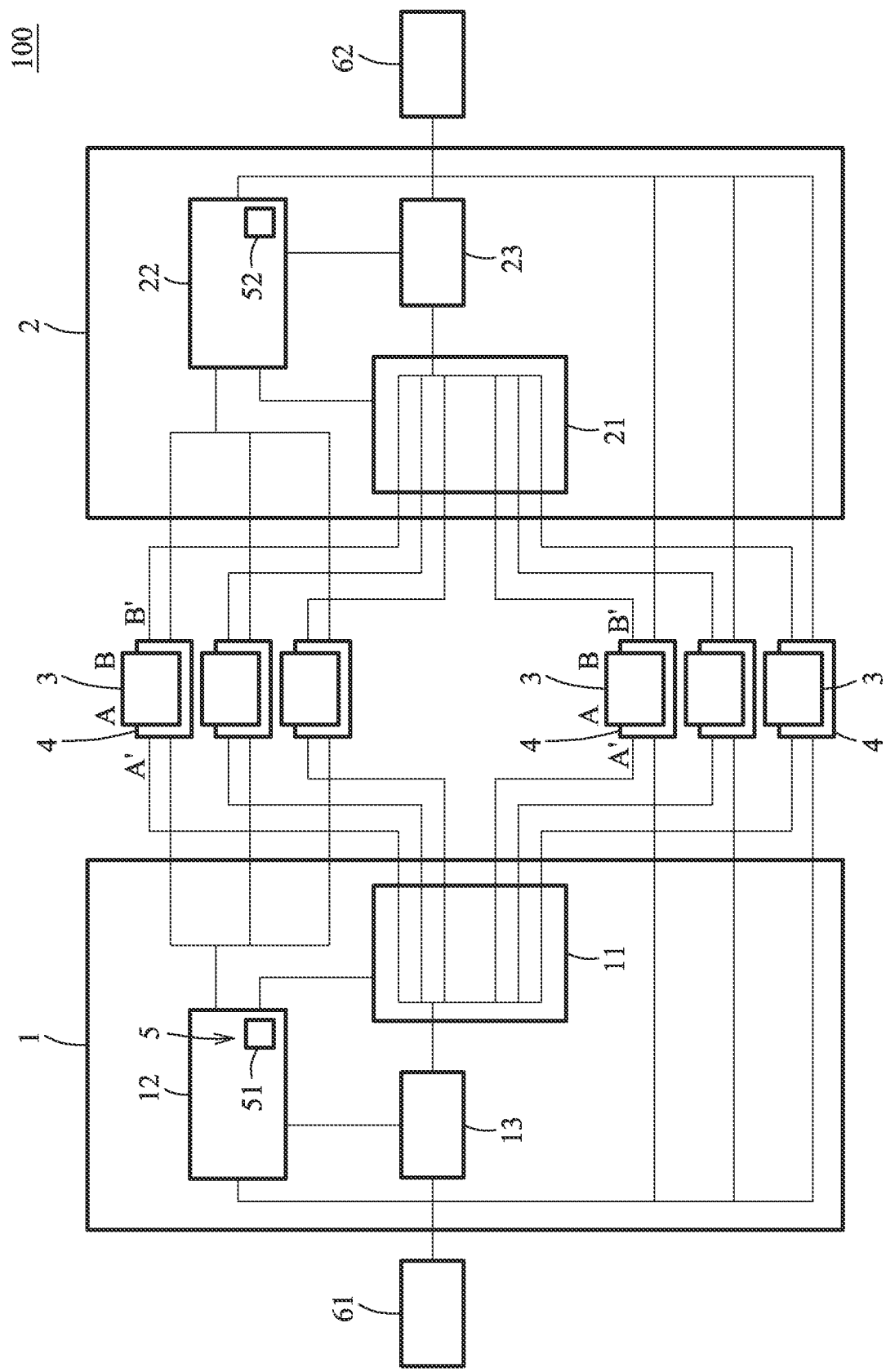
FIG. 2 is a block diagram of an HA system according to an embodiment of the present disclosure.

Referring to FIG. 2, an embodiment of a high availability (HA) system 100 is configured to be connected to two hosts 61, 62, and includes a first input/output module (IOM) 1, a second IOM 2, a plurality of slot modules 4 and a plurality of solid state drives (SSDs) 3. It should be noted that each of the SSDs 3 may be a dual-port type SSD (such as NVMe or SAS dual-port SSD, having Port A and Port B) or a single-port type SSD (such as SATA SSD, having only Port A). Furthermore, each of the SSDs 3 has an identification (ID) code, and the ID code includes a Vendor ID (VID) and a Product ID (PID) of the SSD 3. The ID codes serve as unique identifiers for the SSDs 3, respectively, and thus the ID codes of the single-port type SSDs are different and distinguishable from the ID codes of the dual-port type SSDs. The slot modules 4 are mounted on a backplane (not shown) of the HA system 100. The HA system 100 is used to provide functionalities compatible with single-port SSDs under an architecture designed to also work with dual-port SSDs, such that the hosts 61, 62 may have stable access to the SSDs 3. Under this architecture, each of the slot modules 4 has Port A' and Port B'.

The first IOM 1 includes a first switch 11 (e.g., PCIe switch), a first Enclosure Service Manager (ESM) 12 electrically connected to the first switch 11 and to the slot modules 4, and a first system on a chip (SoC) 13 electrically connected to the first switch 11 and the first ESM 12. The host 61 is connected to the first SoC 13, and may send a read/write command for accessing the SSDs 3. The first SoC 13 receives the read/write command from the host 61 and forwards the same to the first switch 11. In a default configuration of the HA system 100, the first switch 11 is controlled by the first ESM 12 to link up to Ports A' of the slot modules 4 and is configured to perform I/O control and access configuration.

The second IOM 2 includes a second switch 21, a second ESM 22 electrically connected to the second switch 21 and to the slot modules 4, and a second SoC 23 electrically connected to the second switch 21 and the second ESM 22. The host 62 is connected to the second SoC 23, and may send a read/write command for accessing the SSDs 3. The second SoC 23 receives the read/write command from the host 62 and forwards the same to the second switch 21. In the default configuration of the HA system 100, the second switch 21 is controlled by the second ESM 22 to link up to Ports B' of the slot modules 4 and is configured to perform I/O control and access configuration.

The plurality of SSDs 3 are connected to the plurality of slot modules 4, respectively. Since the ID codes of the single-port type SSDs are different and distinguishable from the ID codes of the dual-port type SSDs, each of the ID codes may be used to determine whether the corresponding SSD is a dual-port type SSD or a single-port type SSD.

Each of the first ESM 12 and the second ESM 22 may be implemented as a baseboard management controller (BMC), and is used to detect the operating statuses of the SSDs 3 by handshaking via Management Component Transport Protocol System Management Bus (MCTP over SMBUS) through the slot modules 4 and to report the operating statuses to the corresponding one of the hosts 61, 62. For each of the SSDs 3, the operating status includes presence or absence of a physical connection between the SSD 3 and the corresponding slot module 4.

The HA system 100 further includes a memory unit 5 that may be accessed by the first IOM 1 and the second IOM 2 and that has a white list stored therein. Specifically, the white list includes the ID code(s) of the single-port type SSD(s). In this embodiment, the memory unit 5 includes a first memory device 51 implemented in the first ESM 12 and a second memory device 52 implemented in the second ESM 22. Each of the first memory device 51 and the second memory device 52 has the white list stored therein.

In this embodiment, the HA system 100 has an active-passive HA configuration, in which the first IOM 1 is configured to operate in an active mode, and the second IOM 2 is configured to operate in a passive mode, and the white list stored in the first memory device 51 may be edited (addition, deletion, replacement, etc.) by a remote computer (not shown) using RESTful command (Representational State Transfer command), and/or using IPMI (Intelligent Platform Management Interface) to communicate with the first memory device 51. Under the active-passive HA configuration, the data stored in the first IOM 1, especially the white list stored in the first memory device 51, is backed up to the second IOM 2 periodically. Since this architecture is designed to work with dual-port SSDs, in most cases, the slot modules 4 are inserted with dual-port type SSDs. Under the active-passive HA configuration, once the first IOM 1 fails or is abnormal, the second IOM 2 switches to the active mode to access the SSDs 3 via Port B' seamlessly.

In some cases, one or more slot modules 4 are inserted with single-port type SSDs. In this embodiment, the first IOM 1 and the second IOM 2 execute two procedures shown in FIGS. 3 and 4, respectively, so as to avoid unstable data access to the SSDs 3. It should be noted that each of the two procedures is implemented with respect to each of the slot modules 4, but exemplary description with respect to only one slot module 4 and the corresponding SSD 3 that is connected to the slot module 4 is provided below for the sake of brevity.

Figure 3:
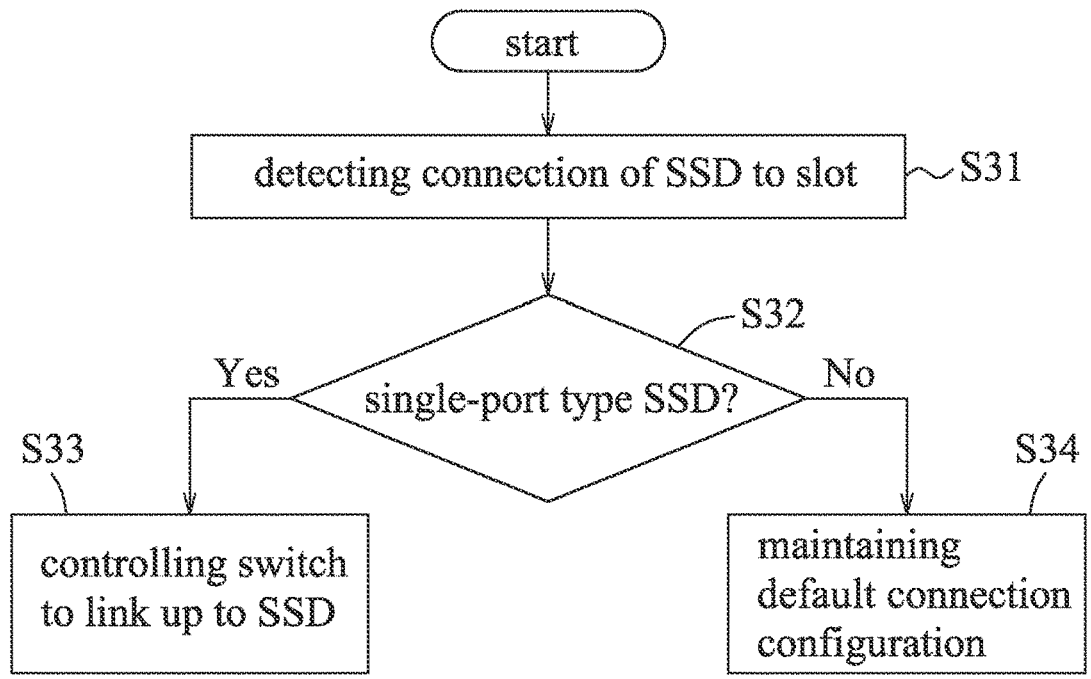
FIG. 3 is a flowchart of a procedure implemented by a first input/output module of the HA system according to an embodiment of the present disclosure.

Referring to FIG. 3, the first ESM 12 detects a connection of the SSD 3 to the slot module 4 (step S31). Specifically, in this embodiment, the way the first ESM 12 detects the connection of the SSD 3 to the slot module 4 is by broadcasting inquiry signals to all of the slot modules 4 and receiving responses respectively from the slot modules 4. Each of the responses includes the operating status of the SSD 3 as described previously, which indicates the presence or the absence of the physical connection between the SSD 3 and the corresponding slot module 4. That is to say, the action of "receiving responses from the slot modules 4" in this disclosure includes "retrieving the operating status from the slot modules 4." In the case where the operating status indicates the presence of the physical connection, the response further includes the ID code of the SSD 3, the first ESM 12 will detect the connection of the SSD 3 to the slot module 4, and the procedure thus goes to step S32. In the case where the operating status indicates the absence of the physical connection, in some embodiments, the first ESM 12 may further control the first switch 11 to unlink the slot module 4 (that sent the response) by sending a switching command through MRPC over SMBus to the first switch 11, so as to prevent the first SoC 13 from wasting time trying to read the SSD 3 through the slot module 4. That is to say, when the first SoC 13 receives the read/write command from the host 61 for accessing the SSD(s) 3, the first SoC 13 may access the SSD (s) 3 via the slot module 4 that is linked up to the first switch 11, without trying and waiting for the SSD(s) 3 not connected to the slot modules 4, thereby reducing the workload of the first SoC 13.

In step S32, in response to detecting the connection of the SSD 3 to the slot module 4, the first ESM 12 reads the ID code of the SSD 3 via a Management Component Transport Protocol (MCTP) command, and determines whether the SSD 3 is a single-port type SSD based on the white list and the ID code thus read.

When it is determined that the SSD 3 is the single-port type in step S32, the first ESM 12 executes step S33 to ensure that data can be read from and write to the SSD 3 via Port A' of the slot module 4. When it is determined that the SSD 3 is not the single-port type in step S32, it means that both Port A' and Port B' of the slot module 4 can be connected by the SSD 3, so the first ESM 12 executes step S34 to maintain a default connection configuration for the dual-port type SSD (see FIG. 2).

Specifically, in step S33, the first ESM 12 controls the first switch 11 to link up to the slot module 4 by sending a switching command through MRPC (Memory-mapped Remote Procedure Call) over SMBus to the first switch 11. In step S34, the first ESM 12 simply keeps the first switch 11 in the original connection.

Figure 4:
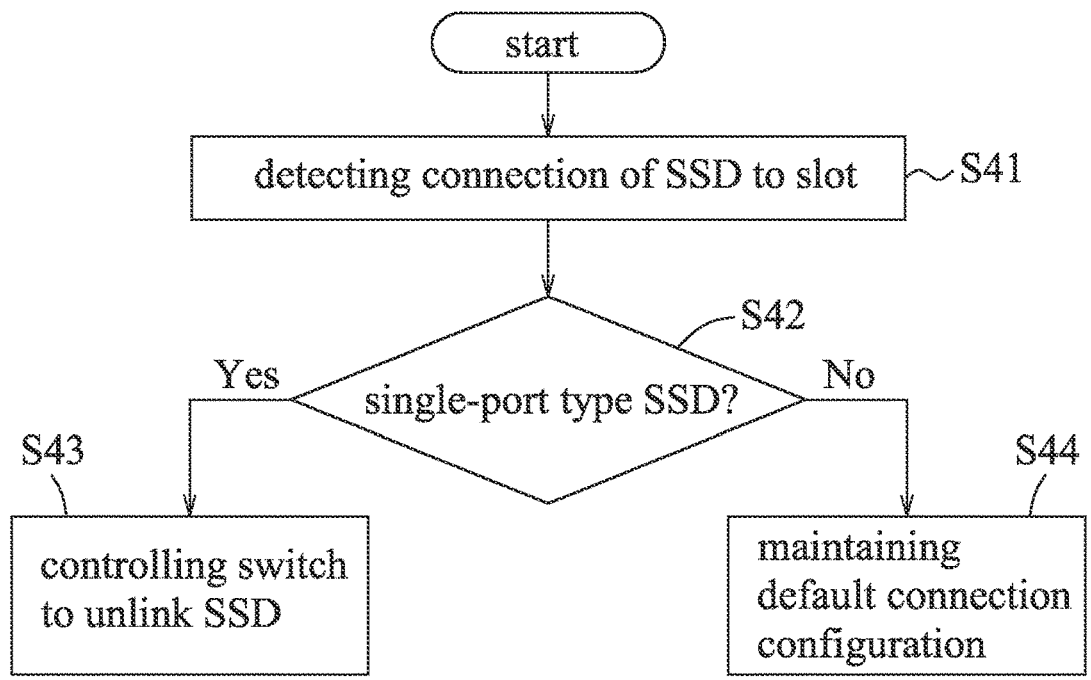
FIG. 4 is a flowchart of a procedure implemented by a second input/output module of the HA system according to an embodiment of the present disclosure.

Referring to FIG. 4, the second ESM 22 initially detects a connection of the SSD 3 to the slot module 4 (step S41).

In step S42, in response to detecting the connection of the SSD 3 to the slot module 4, the second ESM 22 reads the ID code of the SSD 3 via the MCTP command, and determines whether the SSD 3 is a single-port type SSD based on the white list and the ID code thus read. When it is determined that the SSD 3 is the single-port type in step S42, the second ESM 22 executes step S43 to ensure that data cannot be read from and write to the SSD 3 via Port B' of the slot module 4. When it is determined that the SSD 3 is not the single-port type in step S42, it means that both Port A' and Port B' of the slot module 4 can be connected by the SSD 3, so the second ESM 22 executes step S44 to maintain the default connection configuration.

Figure 5:
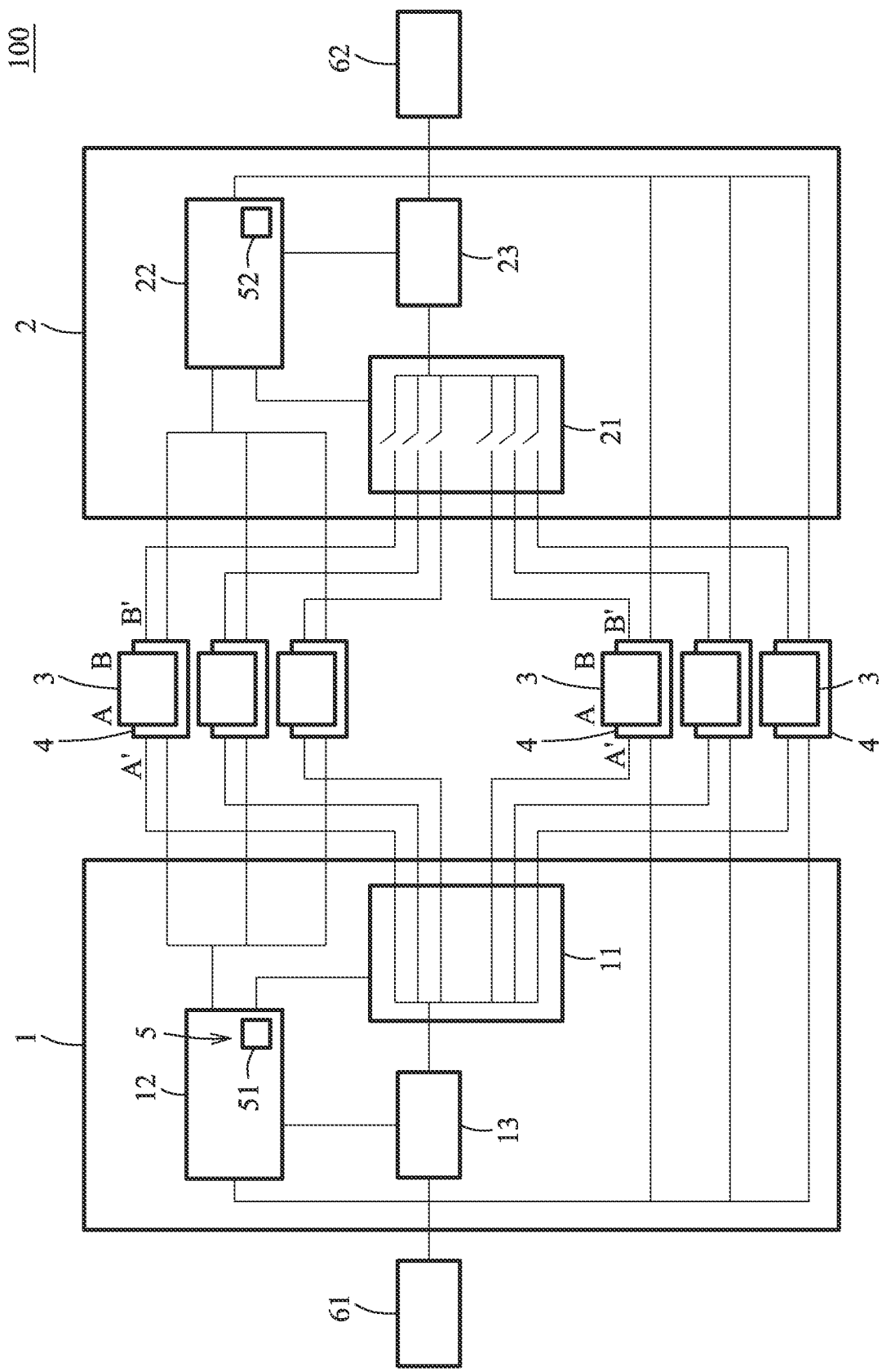
FIG. 5 is a block diagram of the HA system of FIG. 2, illustrating a second switch unlinking slot modules that are inserted with single-port type SSDs.

Specifically, in step S43, the second ESM 22 controls the second switch 21 to unlink the slot module 4 by sending a switching command through MRPC over SMBus to the second switch 21, so as to disable the second IOM 2 from reading data from and writing data to the SSD 3 via Port B' of the slot module 4. In step S44, the second ESM 22 simply keeps the second switch 21 in the original connection. For example, when all of the SSDs 3 are the single-port type, the second ESM 22 may control the second switch 21 to unlink all of the slot modules 4 as shown in FIG. 5.

Figure 6:
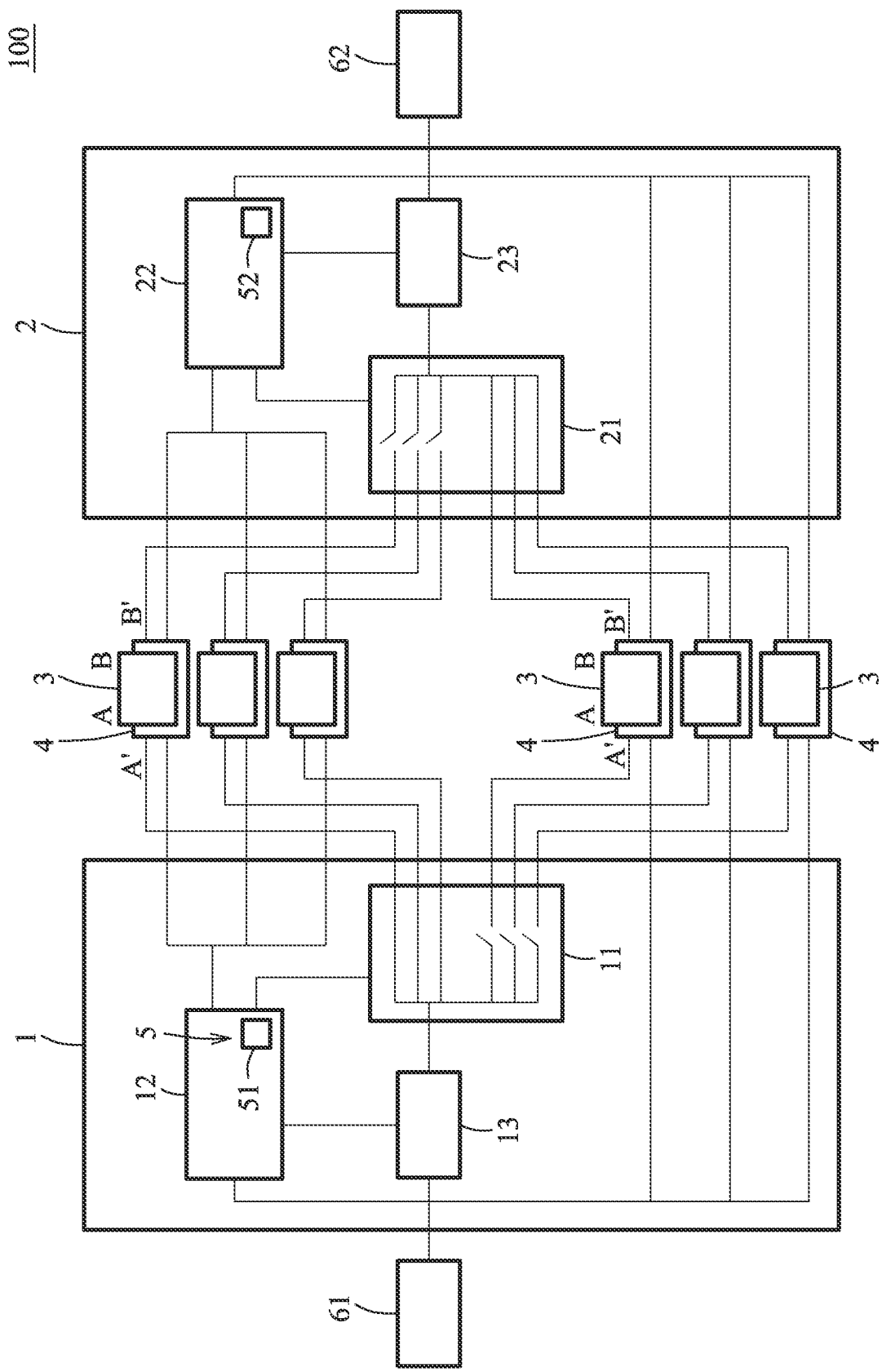
FIG. 6 is a block diagram of an HA system according to another embodiment of the present disclosure, illustrating a default connection configuration where half of the slot modules are initially configured to be linked up to a first switch and the other half of the slot modules are initially configured to be linked up to a second switch.

In another embodiment, the HA system 100 may have an active-active HA configuration, in which workloads may be distributed across the first IOM 1 and the second IOM 2. Under the active-active HA configuration, the data stored in the first IOM 1 and the data stored in second IOM 2 are backed up in an interactive manner; that is to say, the data stored in the first IOM 1 is backed up to the second IOM 2 when the first IOM 1 is operating, and the data stored in the second IOM 2 is backed up to the first IOM 1 when the second IOM 2 is operating. FIG. 6 illustrates another default connection configuration where half of the slot modules 4 are initially assigned to be linked up to the first switch 11 and the other half of the slot modules 4 are initially configured to be linked to the second switch 21.

Figure 7:
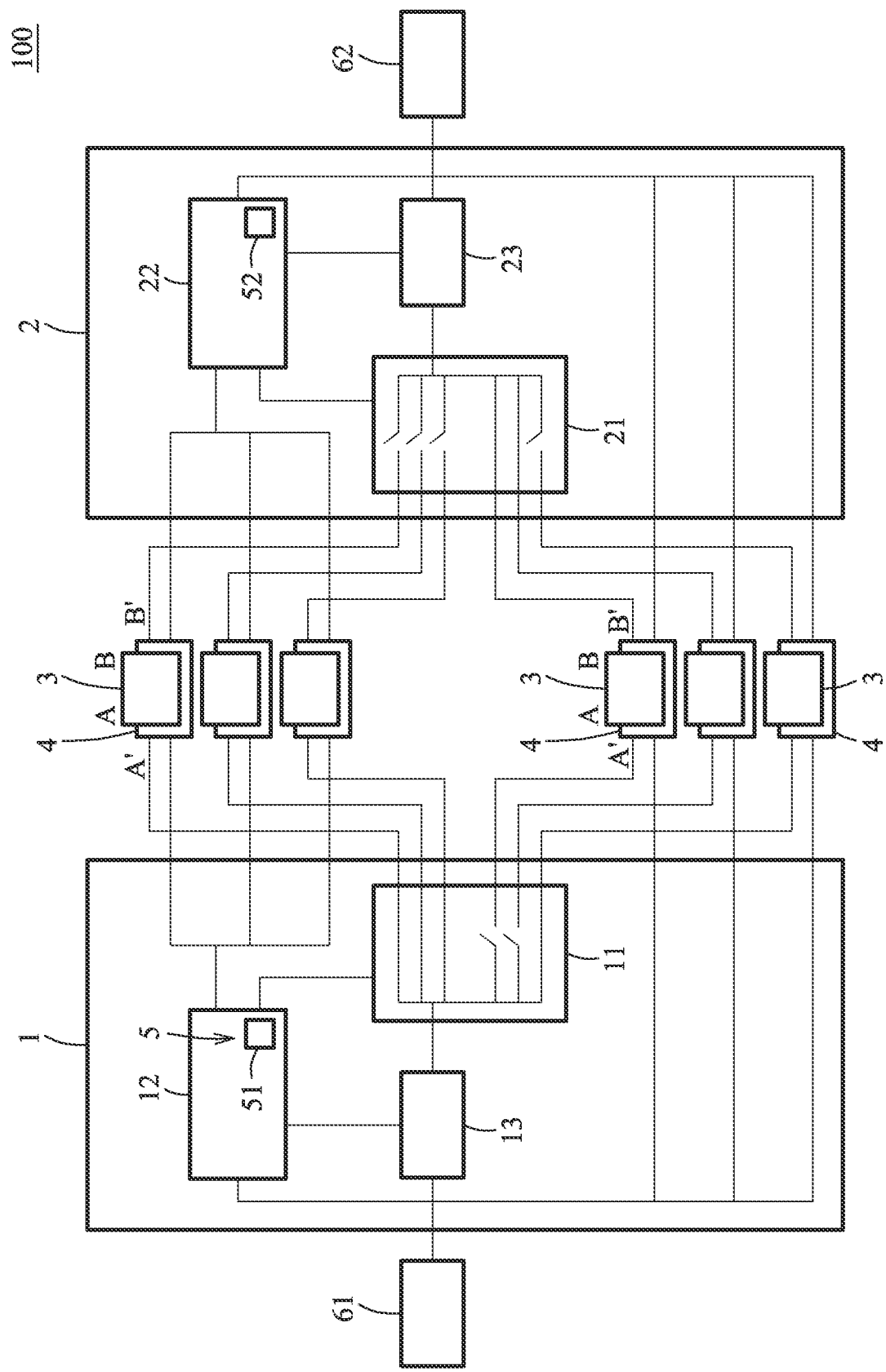
FIG. 7 is a block diagram of the HA system of FIG. 6, illustrating the second switch unlinking a slot module that is initially assigned to be linked up to the second switch and that is inserted with a single-port type SSD.

FIG. 7 provides an example of one of the slot modules 4 (the bottom one) that is initially assigned to be linked up to the second switch 21 and that is inserted with a single-port type SSD. In this embodiment, the first ESM 12 detects a connection of the SSD 3 to the slot module 4 (step S31), and determines that the SSD 3 is a single-port type SSD based on the white list (step S32). Then, the first ESM 12 executes step S33 to control the first switch 11 to link up to the slot module 4. Meanwhile, the second ESM 22 detects a connection of the SSD 3 to the slot module 4 (step S41), and determines that the SSD 3 is a single-port type SSD based on the white list (step S42) as well. Then, the second ESM 22 executes step S43 to control the second switch 21 to unlink the slot module 4 (as shown in FIG. 7).

In this way, whenever a single-port type SSD is inserted, the HA system 100 can ensure that the first switch 11 links up to the slot module 4 and the second switch 21 does not link up to the slot module 4, thus avoiding the inability of both of the host 61 and the host 62 to access the SSD 3. That is to say, in the case where a single-port type SSD is inserted, it is ensured that the host 61 can access the single-port type SSD only through the first IOM 1.

In summary, the above embodiments of the disclosure use the white list to identify single-port type SSDs and force the Ports B' of the corresponding slot modules 4 to be unusable without modifying the hardware originally used to support dual-port type SSDs. In this way, the purpose of supporting single-port type SSDs and avoiding instability of the HA system 100 is achieved in a cost-efficient manner.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A high availability (HA) system, comprising:
a first input/output module (IOM) including a first switch;
a second IOM including a second switch; wherein said first and second switches are configured to perform I/O control and access configuration; and
a plurality of slot modules configured to be connected to a plurality of solid state drives (SSDs), respectively, each of said slot modules having Port A' configured to be connected to said first IOM and Port B' configured to be connected to said second IOM, wherein each of said SSDs is either a dual-port type SSD or a single-port type SSD, and has an identification (ID) code that is used to determine whether said SSD is a dual-port type SSD or a single-port type SSD;
wherein said first IOM, in response to detecting a connection of any one of said SSDs to one of said slot modules, determines whether said SSD is a single-port type SSD, and controls said first switch to link up to said one of said slot modules so as to enable said first IOM to read data from and write data to said SSD via Port A' of said one of said slot modules when it is determined that said SSD is a single-port type SSD;
wherein said second IOM, in response to detecting a connection of any one of said SSDs to one of said slot modules, determines whether said SSD is a single-port type SSD, and controls said second switch to unlink said one of said slot modules when it is determined that said SSD is a single-port type SSD.

2. The HA system as claimed in claim 1, further comprising a memory unit configured to be accessed by said first IOM and said second IOM and having a white list stored therein, the white list including the ID code(s) of the single-port type SSD(s);
wherein each of said first IOM and said second IOM, in response to detecting a connection of any one of said SSDs to one of said slot modules, determines whether said SSD is a single-port type SSD based on the white list.

3. The HA system as claimed in claim 2, wherein:
said first IOM further includes a first Enclosure Service Manager (ESM) electrically connected to said first switch and to said slot modules;
said second IOM further includes a second ESM electrically connected to said second switch and to said slot modules; and
said first ESM and said second ESM are configured to detect the connections of said SSDs.

4. The HA system as claimed in claim 3, wherein each of said first ESM and said second ESM is configured to, with respect to each of said SSDs, read the ID code from said SSD via a Management Component Transport Protocol (MCTP) command, and determine whether said SSD is a single-port type SSD based on the white list and the ID code thus read.

5. The HA system as claimed in claim 3, wherein said first ESM controls said first switch to link up to said one of said slot modules, and said second ESM controls said second switch to unlink said one of said slot modules by sending switching commands through MRPC (Memory-mapped Remote Procedure Call) over SMBus.

6. The HA system as claimed in claim 3, wherein said memory unit includes a first memory device implemented in said first ESM and a second memory device implemented in said second ESM, and each of said first memory device and said second memory device has the white list stored therein.

7. The HA system as claimed in claim 6, wherein the white list stored in said first memory device is edited by a remote computer using RESTful command (Representational State Transfer command), using IPMI (Intelligent Platform Management Interface) to communicate with said first memory device, or using both RESTful command and IPMI.

8. The HA system as claimed in claim 6, wherein said HA system has an active-passive HA configuration, said first IOM is configured to operate in an active mode, and said second IOM is configured to operate in a passive mode; and wherein said first IOM backs up data including the white list to said second IOM periodically.

9. The HA system as claimed in claim 6, wherein said HA system has an active-active HA configuration, and said first IOM backs up data including the white list to said second IOM and said second IOM backs up data including the white list to said first IOM interactively and periodically.

10. An input/output module (IOM) assembly of an HA system, the HA system including a plurality of slot modules that each have Port A' and Port B', and a plurality of solid state drives (SSDs) that are configured to be connected to the plurality of slot modules, respectively, each of the SSDs is either a dual-port type SSD or a single-port type SSD, and has an identification (ID) code that is used to determine whether the SSD is a dual-port type SSD or a single-port type SSD; said IOM assembly comprising:
a first IOM including a first switch; and
a second IOM including a second switch;
wherein said first and second switches are configured to perform I/O control and access configuration;
wherein said first IOM, in response to detecting a connection of any one of the SSDs to one of the slot modules, determines whether the SSD is a single-port type SSD, and controls said first switch to link up to said one of the slot modules so as to enable said first IOM to read data from and write data to the SSD via Port A' of said one of the slot modules when it is determined that the SSD is a single-port type SSD; and
wherein said second IOM, in response to detecting a connection of any one of the SSDs to one of the slot modules, determines whether the SSD is a single-port type SSD, and controls said second switch to unlink said one of the slot modules when it is determined that the SSD is a single-port type SSD.

11. The IOM assembly as claimed in claim 10, wherein:
said first IOM further includes a first Enclosure Service Manager (ESM) electrically connected to said first switch;
said second IOM further includes a second ESM electrically connected to said second switch; and
said first ESM and said second ESM are configured to be connected to the slot modules and to detect the connections of the SSDs.

12. The IOM assembly as claimed in claim 10, wherein:
said first ESM includes a first memory device;
said second ESM includes a second memory device;
each of said first memory device and said second memory device has a white list stored therein, the white list including the ID code(s) of the single-port type SSD(s); and
each of said first IOM and said second IOM, in response to detecting a connection of any one of the SSDs to one of the slot modules, determines whether the SSD is a single-port type SSD based on the white list.

* * * * *